Figure 1:
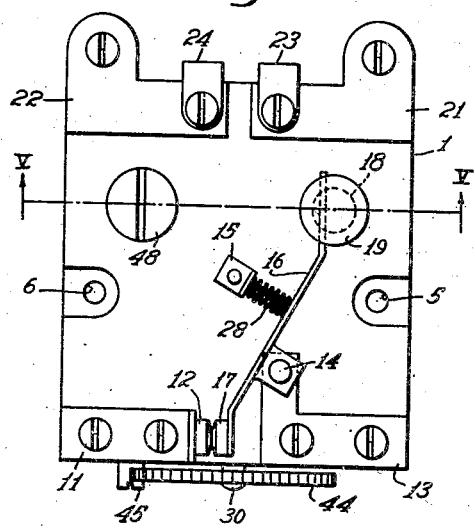

Dec. 17, 1946.　　　G. C. ARMSTRONG　　　2,412,854
THERMOSTATIC RELAY
Filed March 8, 1944　　　2 Sheets-Sheet 1

WITNESSES:
Edward Michaels

INVENTOR
George C. Armstrong.
BY
Paul E. Friedemann
ATTORNEY

Dec. 17, 1946.                G. C. ARMSTRONG                2,412,854
                                THERMOSTATIC RELAY
                              Filed March 8, 1944              2 Sheets-Sheet 2

WITNESSES:
Edward Michaels
Curt M. Avery

INVENTOR
George C. Armstrong.
BY
Paul E. Friedemann
ATTORNEY

Patented Dec. 17, 1946

2,412,854

UNITED STATES PATENT OFFICE 2,412,854

THERMOSTATIC RELAY

George C. Armstrong, Wilkinsburg, Pa., assignor to Westinghouse Electric Corporation, East Pittsburgh, Pa., a corporation of Pennsylvania Application March 8, 1944, Serial No. 525,541

15 Claims. (Cl. 74—2)

My invention relates to thermally operating electric overload relays and other electric devices in which a spring biased movable member is normally prevented from following its bias and is released electrically upon the occurrence of a given release condition.

It is an object of the invention to provide devices of the just-mentioned type with heat-responsive clutching and release means of improved design and operation. More particularly, the invention aims at providing overload relays with releasable clutching means of great reliability, sensitivity, and accuracy of operation which are also distinguished by extremely small space requirements. It is also an object to design a device of the type above referred to in such a manner that the releasable latching or clutching means act along the entire periphery of the movable relay member to be latched so as to be capable of exerting a considerable holding force thereon; and it is further aimed at achieving this result while requiring only a slight movement of the clutch or latch means for effecting the release of the movable member.

Another object of my invention is to provide a relay or other device of the type mentioned which is capable of withstanding extremely high impact forces or vibrations such as occurring under shock, and which does not tend to perform uncontrolled operations when exposed to such shock forces. In particular, it is intended by this invention to provide a thermostatic contactor that, when exposed to shock, does not release its contact member or to otherwise change the contact position occupied previous to the shock.

An object is also the provision of a device which is shock-proof in the manner just mentioned by virtue of its inherent mechanical properties, that is, without necessitating the use of additional shock or vibration responsive latching devices.

A still further object of the invention is to devise a contactor, relay, or the like apparatus which, while protected from undesired operation due to shock, is, nevertheless, capable of intentional or desired operation during the periods of persistence of shock forces or motions.

In other aspects, my invention aims at a construction of an electric overload relay which, in conjunction with one or several of the aforementioned objects, is also distinguished by insensitivity to changes in ambient temperature and affords adjusting its datum value of release within wide limits of overload currents.

In order to achieve these objects and in accordance with my invention, I provide a relay or other device of the type mentioned with a rotary member which is spring biased for rotation in one direction and normally retained against this bias by two thermostats arranged on opposite axial sides of the rotary member for thermoresponsive deflection in the same axial direction. The two spring biased thermostats engage the member so as to secure it normally in a given angular position regardless of changes in the ambient temperature, since such changes deflect both thermostats equally and hence do not loosen their grip on the rotary member. One of the thermostats is provided with electric heating means which, when sufficiently energized, cause it to deflect to a larger extent than the other thermostat. A stationary stop is provided which, upon excessive deflection of the electrically heated thermostat, is engaged by one of the thermostats and thereby renders the thermostats ineffective as regards their grip on the rotary member. As a result, the member is released for rotation under its spring bias.

The invention, in another aspect, involves the provision of two parallel plungers which engage the rotary relay member at radially opposite sides and are approximately balanced as regards the axis of rotation so as to render the relay substantially shockproof.

Figure 2:
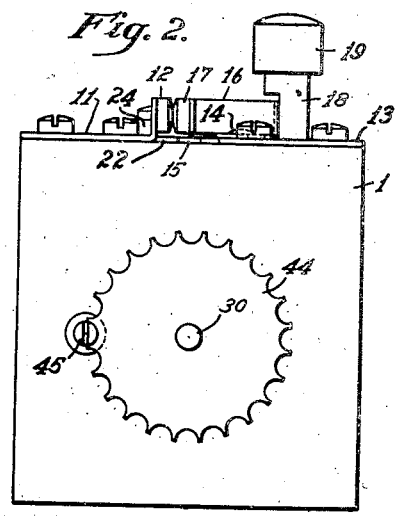
Figure 3:
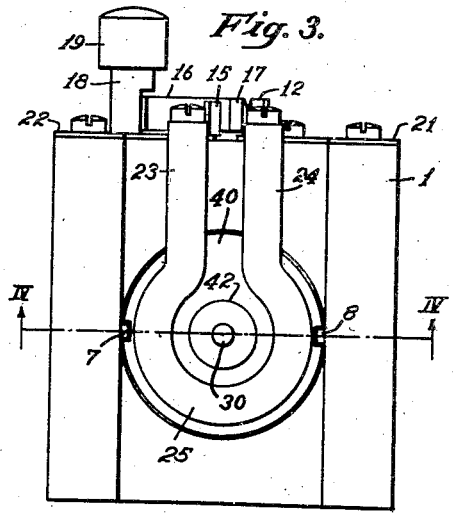
Figure 4:
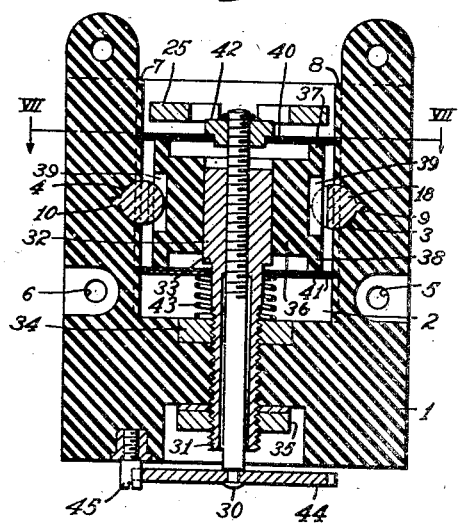
Figure 5:
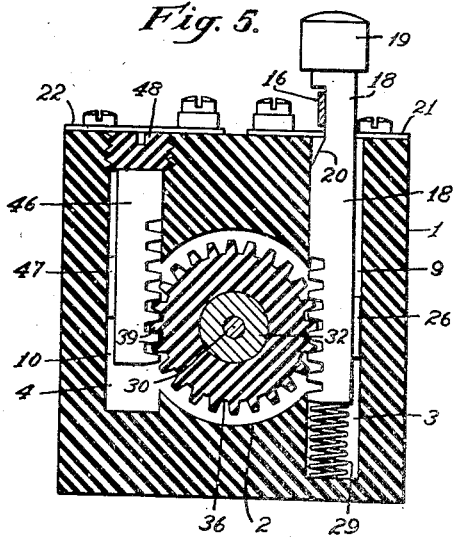
Figure 6:
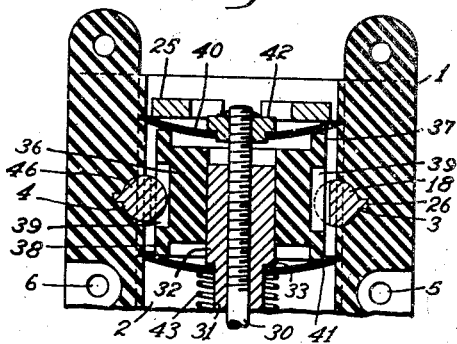
Figure 7:
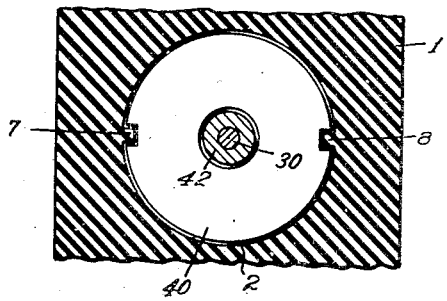

These and other features of the invention will be understood from the following description of the embodiment of a thermostatic overload relay illustrated in the drawings, in which:

Figure 1 is a top view of the overload relay;
Fig. 2 a view from one axial side of the relay; and
Fig. 3 a view from the other side;
Fig. 4 represents an axial section taken along the plane denoted in Fig. 3 by the dot-and-dash lines marked IV—IV;
Fig. 5 is a cross-section taken along the plane denoted in Fig. 1 by the dot-and-dash lines marked V—V;
Fig. 6 is a partial sectional view similar to Fig. 4 showing the thermostatic mechanism of the relay in a condition occurring under a high ambient temperature, the effect being exaggerated for explanatory reasons; and
Fig. 7 is another cross-section through part of the device taken along the plane denoted in Fig. 4 by the dot-and-dash line marked VII—VII.

According to the drawings, the illustrated overload relay has an insulating body 1 for accommodating all other component relay parts. The body 1 has a cylindrical cavity 2 which extends axially through the major portion of the body. This cavity communicates with two tangential bores 3 and 4 which extend in parallel to each other and are open towards the top surface of the body 1. Two lateral openings 5 and 6 (Figs. 1 and 4) are provided for mounting the relay on a suitable support. The cylindrical cavity 2 has two diametrical projections 7 and 8 (Figs. 4 and 7) and the tangential bores 3 and 4 have radial extensions or grooves 9 and 10 (Figs. 4 and 5).

A contact terminal 11 is mounted on the top surface of the insulating body 1 (Figs. 1 and 2) and carries a stationary contact 12. A second terminal 13 also mounted on the top surface of the insulating body carries a pivot pin 14. An upwardly extending part 15 is attached to body 1. A contact lever 16 is pivotally mounted on pin 14 and carries a contact 17 to cooperate with the stationary contact 12. A helical compression spring 28, disposed between part 15 and contact lever 16, biases the lever towards the contact closing position shown in Figs. 1 and 2.

The contact lever 16 is controlled by a plunger 18 arranged in the bore 3 of the insulating body. The plunger has a radial projection 26 which engages the groove 9, and hence prevents the plunger from rotating while permitting it to reciprocate along the bore. The plunger carries a push button 19 and has an inclined surface portion at 20 engaged by the contact lever 16. A helical compression spring 29, located underneath the plunger 18 in bore 3, tends to move the plunger in the upward direction (Fig. 5). The plunger has a toothed or rack-shaped portion which engages the toothed portion of a drum 36. Hence, when the push button 19 is in the depressed position shown in Figs. 1 and 5, the drum 36, when clutched against rotation, will maintain the plunger and push button in the illustrated position, so that the contacts 12 and 17 remain closed. It will be apparent that the spring 29 exerts a bias on the drum 36 tending to rotate this drum in the anti-clockwise direction. Hence, when the drum is released, it will rotate in this direction while the plunger 18 moves upwardly. Such upward motion has the effect of moving the inclined surface portion 20 along the contact lever 16, thereby pushing the lever 16 radially away from the plunger in opposition to the bias of spring 28 (Fig. 1). As a result, the contacts 12 and 17 are opened during the just mentioned upward motion of the plunger.

The insulating body 1 is further provided with two contact terminals 21 and 22 both arranged on the top surface of the body and provided with binding posts for connecting the leads of the main circuit thereto. The two terminals 23 and 24 of a heating winding 25 are attached to the respective terminals 21 and 22. The effective portion of the heater 25 extends into the cavity 2 of the insulating body (Fig. 4) and serves to operate the clutch mechanism to be described presently.

The clutch mechanism for holding the contact actuating plunger in its depressed position comprises a shaft 30 which carries a sleeve 31 screwed onto the shaft. A radially projecting bearing portion 32 of the sleeve forms a circumferential stop surface at 33 and serves as a bearing for the above-mentioned clutch drum 36. This drum has axially projecting flange portions 37 and 38 and is provided with a toothed or geared portion 39 for engagement by the rack-shaped surface portion of the plunger 18.

Two thermostats 40 and 41 are disposed at axially opposite sides of the clutch drum 36. These thermostats, in the illustrated embodiment, consist each of a group of thin bimetal discs whose shape is best apparent from Fig. 6. These discs have two diametrical notches for engagement by the projections 7 and 8 of the insulating body 1. Due to this engagement, the thermostatic discs are permitted to shift axially along the cylindrical cavity 2, but are prevented from rotating relative to the body 1. The two thermostats 40 and 41 engage the adjacent flange portions 37 and 38, respectively, of the clutch drum 36. The thermostat 40 is held in position by means of a lock nut 42 screwed onto the shaft 30. Since this shaft is in threaded engagement with the sleeve 31, and the latter firmly secured to the insulating body 1 by means of nuts 34 and 35, the central portion of the thermostat 40 is prevented from moving in the upward direction (Fig. 4). The thermostat 41 is pressed against the lower flange 38 of drum 36 by means of a helical compression spring 43. It will be noted from Fig. 4 that the peripheral stop surface 33 of sleeve 31 is usually in proximity to the thermostat 41, a small gap being maintained between the stop surface and the thermostat. This gap can be adjusted or varied by revolving the shaft 30, thus threading it more or less into the sleeve 31 and thereby raising or lowering the lock nut 42 and, hence, the entire spring biased clutch mechanism. In order to permit such an adjustment, a star wheel 44 is firmly mounted on the shaft 30 (Figs. 2 and 4). A set screw 45 engages the star wheel 44, and permits fastening it in a selected position.

The above-mentioned heating winding 25 lies close to the thermostatic disc 40 and hence, when heated by sufficient electric current, will affect this upper thermostat to a considerably greater extent than the lower thermostat 41. However, both thermostats respond substantially equally to gradual increases in ambient temperature, since the latter affects all parts of the relay to substantially the same extent.

Disregarding for the present the fact that another plunger, denoted by 46 (Fig. 5), is present, the operation of the above-described parts of the overload relay is as follows. In normal condition, the clutch spring 43 presses the thermostat 41 against the clutch drum 36 and the latter against the thermostat 40 whose upward motion is stopped by the lock nut 42. As a result, the friction acting circumferentially between the drum 36 and the two thermostats prevents the drum from following the rotary bias exerted by spring 29 when the plunger 18 is in the illustrated depressed position with relay contacts 12 and 17 closed, as shown in Figs. 1 and 5. When the relay is exposed to increasing ambient temperatures, the two bimetal thermostats 40 and 41 will bend outwardly in the same degree—for instance, as shown in Fig. 6. Since the central portion of thermostat 40 remains fixed, relative to body 1, due to its abutment against the lock nut 42, the concurrent deflection of both thermostats has the effect of shifting the clutch drum 36 upwardly along its seat 32. However, since the distance between corresponding points of the two thermostats remains unchanged, the central portion of the thermostat 41 remains at the original distance from the stop surface 33. Consequently, the clutch spring 43 remains effective and continues to press the thermostats against the clutch drum 36. Therefore, a change in ambient temperature will not release the frictional grip of the thermostats on the drum, and hence cannot affect the operation of the relay.

On the other hand, if the current supplied to terminals 21 and 22, and controlled by the relay contact between 12 and 17 (Fig. 1), exceeds a given magnitude, the heating effect of winding 25 causes the upper thermostat 40 to deflect considerably more than the lower thermostat 41 (Figs. 4 and 7). As a result, the distance between corresponding points of the two thermostats increases and the central portion of thermostat 41 abuts against the stationary stop surface 33. This stops the further action of the clutch spring 43 so that the continued deflection of thermostat 40 has the effect of removing the thermostat from the clutch drum, thereby releasing its frictional grip. As a result, the clutch drum and the plunger 18 are free to move under the bias of spring 29 (Fig. 5). The inclined surface 20 moves the contact lever 16 and opens contacts 12 and 17 (Fig. 1). This causes an interruption of the main current or produces some other control action by means of a contactor (not illustrated) actuated by the opening of contacts 12 and 17.

The second plunger 46, provided in the tangential bore 4 of the insulating body 1 (Figs. 4 and 5), has a mass corresponding substantially to the total mass of the plunger 18 and push button 19. A radial projection 47 of plunger 46 engages the groove 10 and thus prevents the plunger from rotating. A rack-shaped surface portion of plunger 46 engages the gear portion 39 of the clutch drum 36. The bore 4 is covered by a stopper 48 which may also serve as a stop for limiting the upward motion of the plunger 46. It will be apparent from Fig. 5 that the plunger 46 moves simultaneously with the actuating plunger 18, but always in the opposite direction.

During the normal operation of the relay, as described above, the plunger 46 has no operative effect except that it may serve as a stop for limiting the upward or downward motion or both of the actuating plunger 18. However, when the relay is exposed to shock or vibration, the second plunger has a balancing effect and prevents such disturbing forces from operating the relay. When a shock force occurs, such force may be transmitted to the clutch mechanism substantially in three different ways. One possibility of shock transmission is given by the shaft and sleeve assembly of the clutch due to a back, front or side blow, Fig. 1. Any force transmitted through the shaft remains virtually ineffective as regards the operation of the clutch mechanism because the clutch drum as well as the thermostatic clutch members are symmetrically arranged and hence statically and dynamically balanced with respect to the shaft. A second possibility of shock transmission is given by the presence of the actuating plunger 18. However, a shock tending to move the plunger 18 tangentially to the clutch drum will have the same effect on the balancing plunger 46. Since the two plungers act in opposition on the clutch drum, the shock forces transmitted by them will produce equal momentums and hence cancel each other as regards the effect on the clutch mechanism. The third possibility is longitudinal acceleration due to a top or bottom blow, Fig. 1. However this results in an increase in the frictional force between the drum and either the top or bottom bimetal discs. Consequently, the relay is virtually insensitive to high intensity shock forces without requiring the presence of shock-responsive latching devices.

Being aware of the fact that devices according to my invention can be modified in various respects by those skilled in the art without departing from the objects and gist of the invention, I wish this specification to be understood as illustrative and not in a limiting sense.

I claim as my invention:

1. A heat-responsive and ambient-temperature compensated relay comprising a rotary and axially displaceable member spring biased for rotation, two thermostats axially movable in the same direction in response to heat and disposed for normally engaging said rotary member at axially opposite sides so as to prevent it, when moved against its spring bias, to perform a return motion under said bias, stationary stop means for limiting the heat-responsive axial motion of one of said thermostats in order to release said member, and heating means associated with one of said thermostats for heating it in order to cause it to abut against said stop means upon occurrence of a given release condition.

2. A thermostatic and ambient-temperature compensated relay comprising a spring biased rotary member and a stop member axially movable relative to one another, two thermostats arranged for heat-responsive deflection in the same axial direction of said rotary member, said thermostats being mounted on one of said members and engaging said other member at axially opposite sides of said rotary member so as to prevent said rotary member from rotating under its bias, one of said thermostats being arranged relative to said stop member so as to abut against it when thermally deflected a given amount thereby releasing said rotary member for spring biased rotation, and electric heating means associated with one of said thermostats for causing it to deflect more than said other thermostat upon occurrence of a given release condition.

3. A thermostatic an ambient-temperature compensated relay comprising a rotary and axially displaceable member spring biased for rotation in one direction, two thermostats deflectable in the same axial direction and arranged at opposite axial sides of said rotary member, an axially operating spring disposed for normally holding said thermostats in engagement with said rotary member to retain it in opposition to its rotary spring bias, stationary stop means for limiting the heat-responsive axial motion of one of said thermostats in order to release said member, and heating means associated with one of said thermostats for heating it in order to cause it to abut against said stop means upon occurrence of a given release condition.

4. A thermostatic and ambient-temperature compensated relay comprising a rotary and axially displaceable member spring biased for rotation in one direction, two non-rotatable bimetal discs arranged for heat-responsive deflection in the same axial direction so as to normally engage said member at opposite axial sides in order to retain it against it spring bias, stationary stop means for limiting the heat-responsive axial motion of one of said thermostats in order to release said member, and heating means associated with one of said thermostats for heating it in order to cause it to abut against said stop means upon occurrence of a given release condition.

5. A thermostatic and ambient-temperature compensated relay comprising a rotary and axially displaceable member spring biased for rotation in one direction, two non-rotatable bimetal discs arranged for heat-responsive deflection in the same axial direction and at opposite axial sides of said member, an axially operating spring disposed for normally holding said discs in engagement with said rotary member to retain it in opposition to its rotary spring bias, stationary stop means for limiting the heat-responsive axial motion of one of said thermostats in order to release said member, and heating means associated with one of said thermostats for heating it in order to cause it to abut against said stop means upon occurrence of a given release condition.

6. An ambient-temperature compensated thermostatic relay comprising a shaft member having a radial projection, a drum member rotatably mounted on said shaft member, spring means for imposing a rotary bias on said drum member, two thermostatic discs arranged around said shaft member at opposite sides of said drum member for heat-responsive axial deflection in the same direction, one of said discs being firmly connected with said shaft member and the other being as a whole axially movable relative to said shaft member, an axially effective clutch spring tending to hold said other disc toward said projection and against said drum member for retaining said drum member against the bias of said spring means, and electric heating means associated with one of said discs to cause it to deflect more than the other upon occurrence of a given release condition, whereby said other disc is caused to abut against said projection in order to release said drum member for rotation under bias by said spring means.

7. A heat-responsive and ambient temperature compensated relay comprising a rotary and axially displaceable spring biased member, two thermostats axially movable in the same direction in response to heat and disposed for normally engaging said rotary member at axially opposite sides so as to prevent it, when moved against its spring bias, to perform a return motion under said bias, stationary stop means for limiting the heat-responsive axial motion of one of said thermostats in order to release said member, means for adjusting the axial position of said stop means relative to said rotary member, and heating means associated with one of said thermostats for heating it in order to cause it to abut against said stop means upon occurrence of a given release condition.

8. A thermostatic and ambient-temperature compensated relay comprising a support structure, a spring biased movable member mounted on said structure so as to be rotatable and axially displaceable relative thereto, a stop member disposed in said structure and displaceable relative thereto in the axial direction of said movable member, means for adjusting said stop member in a selective fixed position relative to said structure, two thermostats arranged for heat-responsive deflection in the same axial direction of said rotary member, said thermostats being mounted on one of said members and engaging said other member at axially opposite sides of said rotary member so as to prevent said rotary member from rotating under its bias, one of said thermostats being arranged relative to said stop member so as to abut against it when thermally deflected a given amount thereby releasing said rotary member for spring biased rotation, and electric heating means associated with one of said thermostats for causing it to deflect more than said other thermostat upon occurrence of a given release condition.

9. A thermostatic and ambient-temperature compensated relay comprising a rotary and axially displaceable member spring biased for rotation in one direction, two thermostats deflectable in the same axial direction and arranged at opposite axial sides of said rotary member, an axially operating spring disposed for normally holding said thermostats in engagement with said rotary member to retain it in opposition to its rotary spring bias, stop means for limiting the axial deflection of one of said thermostats, adjusting means for selectively varying the position of said stop means in the axial direction of said member, and heating means associated with one of said thermostats for heating it in order to cause it to abut against said stop means upon occurrence of a given release condition.

10. An ambient-temperature compensated thermotatic relay comprising a support, a shaft member secured to said support and having a radially projecting stop, adjusting means for varying the position of said stop relative to said support in the axial direction of said shaft member, a drum member rotatably mounted on said shaft member, spring means for imposing a rotary bias on said drum member, two thermostatic discs arranged around said shaft member at opposite sides of said drum member for heat-responsive axial deflection in the same direction, one of said discs being firmly connected with said shaft member and the other being as a whole axially movable relative to said shaft member, an axially effective clutch spring disposed between said support and said other disc and tending to hold said other disc toward said projections and against said drum member for retaining said drum member against the bias of said spring means, an electric heating means associated with one of said discs to cause it to deflect more than the other upon occurrence of a given release condition, whereby said other disc is caused to abut against said projection in order to release said drum member for rotation under bias by said spring means upon occurrence of a release condition depending upon the adjustment of said adjusting means.

11. A thermostatic and ambient-temperature compensated relay comprising a spring biased rotary member and a stop member axially movable relative to one another, two thermostats arranged for heat-responsive deflection in the same axial direction of said rotary member, said thermostats being mounted on one of said members and engaging said other member at axially opposite sides of said rotary member so as to prevent said rotary member from rotating under its bias, one of said thermostats being arranged relative to said stop member so as to abut against it when thermally deflected a given amount thereby releasing said rotary member for spring biased rotation, a resetting plunger movable tangentially to said rotary member and engaging the latter for transmission of motion, and electric heating means associated with one of said thermostats for causing it to deflect more than said other thermostat upon occurrence of a given release condition.

12. A thermostatic and ambient-temperature compensated relay comprising a spring biased rotary member and a stop member axially movable relative to one another, two thermostats arranged for heat-responsive deflection in the same axial direction of said rotary member, said thermostats being mounted on one of said members and engaging said other member at axially opposite sides of said rotary member so as to prevent said rotary member from rotating under its bias, one of said thermostats being arranged relative to said stop member so as to abut against it when thermally deflected a given amount thereby releasing said rotary member for spring biased rotation, electric heating means associated with one of said thermostats for causing it to deflect more than said other thermostat upon occurrence of a given release condition, a plunger movable tangentially to said rotary member and engaging the latter for transmission of motion, and a second plunger movable in parallel to said first plunger and engaging said rotary member for motion opposite to that of said first plunger, said two plungers being approximately balanced relative to the axis of rotation of said rotary member to render the relay substantially shockproof.

13. An electric relay comprising a spring biased rotary member, releasable clutch means for retaining said member in opposition to its spring bias, a contact actuating plunger engaging said member tangentially for transmission of motion, and a second plunger movable in parallel to said first plunger and engaging said rotary member for motion opposite to that of said first plunger, said two plungers being approximately balanced relative to the axis of rotation of said rotary member to render the relay substantially shockproof.

14. An electric relay comprising a shaft, a spring biased member rotatable about said shaft, clutch means arranged symmetrically and balanced about said shaft and engaging said member for normally retaining it in opposition to its spring bias, electric control means for releasing said clutch means, a contact actuating plunger engaging said member tangentially for transmission of motion, and a second plunger movable in parallel to said first plunger and engaging said rotary member for motion opposite to that of said first plunger, said two plungers being approximately balanced relative to the axis of rotation of said rotary member to render the relay substantially shockproof.

15. An electric relay comprising a shaft, a spring biased member rotatable about said shaft, a bimetal disc surrounding said shaft and normally engaging said member circumferentially for normally retaining it in opposition to its spring bias, electric heating means associated with said disc for causing it to release said member, a contact actuating plunger engaging said member tangentially for transmission of motion, and a second plunger movable in parallel to said first plunger and engaging said rotary member for motion opposite to that of said first plunger, said two plungers being approximately balanced relative to the axis of rotation of said rotary member to render the relay substantially shockproof.

GEORGE C. ARMSTRONG.